(12) United States Patent
Robinson et al.

(10) Patent No.: US 8,736,902 B2
(45) Date of Patent: May 27, 2014

(54) SYSTEM TO ENABLE MULTI-PASS CLEAR TONER LAYER PRINTING

(75) Inventors: David C. Robinson, Penfield, NY (US); Katherine Loj, Rochester, NY (US); Guo-Yau Lin, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 649 days.

(21) Appl. No.: 13/025,422

(22) Filed: Feb. 11, 2011

(65) Prior Publication Data

US 2012/0206741 A1    Aug. 16, 2012

(51) Int. Cl.
G06F 15/00    (2006.01)

(52) U.S. Cl.
USPC .......................................................... 358/1.9

(58) Field of Classification Search
None
See application file for complete search history.

(56) References Cited

U.S. PATENT DOCUMENTS

| 7,295,341 | B2 | 11/2007 | Nagarajan et al. | |
|---|---|---|---|---|
| 2004/0196322 | A1* | 10/2004 | Nakajima et al. | 347/14 |
| 2009/0296120 | A1* | 12/2009 | Tsutsumi | 358/1.9 |
| 2011/0043840 | A1* | 2/2011 | Iinuma | 358/1.9 |

OTHER PUBLICATIONS

U.S. Appl. No. 12/913,226, filed Oct. 27, 2010 titled "Simulated Paper Texture Using Clear Toner on Uniform Substrate", by Qiau Mu.
U.S. Appl. No. 12/968,843, filed Dec. 15, 2010 titled "System to Enable Development of Clear Toner Forms", by David C. Robinson et al.

* cited by examiner

*Primary Examiner* — Benny Q Tieu
*Assistant Examiner* — Sunil Chacko
(74) *Attorney, Agent, or Firm* — Fay Sharpe LLP

(57) ABSTRACT

A method for rendering a clear toner layer is disclosed for a received print job description that is provided in multiple channels, including a clear channel and a color channel. A program selection is executed for a multiple pass operation. Image processing is performed on the print job description to generate a ready-to-print file. A layer of an image is rendered in a first pass using a clear toner applying component and a pigmented toner applying component. The values of the color channel are modified, and the ready-to-print file is modified using the values. The modified ready-to-print file is saved in a ready-to-print format. A layer of the image is rendered in a select pass using only the clear toner applying component.

19 Claims, 3 Drawing Sheets

SYSTEM TO ENABLE MULTI-PASS CLEAR TONER LAYER PRINTING

BACKGROUND

The present disclosure is directed toward a multiple pass operation for use with an image forming apparatus. More particularly, the operation includes a system for providing a select number of passes of a media sheet through the image forming apparatus for rendering a layer of clear toner on the media sheet.

A use of clear toner on printed media sheets is becoming more diverse with newly discovered applications for using the clear toner as a way to achieve particular visible effects. For example, a layer of clear toner may provide the media sheet with a glossy appearance, or it may provide a textured image, that is supported on the media sheet, with a perceived third dimension. One aspect of using clear toner is an ability to produce certain effects while requiring less expensive manufacturing methods and substrate materials. As mentioned, texture is a desired visual effect that may be achieved using clear toner. For example, the use of clear toner on a generally uniform surface may provide the appearance of a third dimension when the toner (i.e., forming the image) is viewed relative to a blank region of the print media sheet. The reflective behavior of the clear toner may further contribute to the degree of the perceived dimension based on a reflection at select viewing angles. To further achieve a perceived textured surface having a noticeable tactile feel to a touch, the media sheet may be subjected to multiple passes through the image forming apparatus for building a clear toner layer having a certain pile height. Each pass may be used to render one coat of the clear toner layer. However, media sheet-degradation is associated with a conventional operation after a certain number of passes. The media sheet generally degrades as it is moved through a paper path. The media sheet may get caught in the paper path if the pile height of the clear toner layer is built too high. Accordingly, the caught media sheet may cause a jam to the image forming apparatus. The jam may decrease a production efficiency of the image forming apparatus if additional, queued print jobs are held until the jam is remedied and the apparatus is made operative again.

Another problem associated with a conventional operation is an increased risk of the toner particles not fully melting onto the print media sheet after a certain number of passes. The toner particles that fail to adhere to the underlying clear coat may deposit on stations of the image forming apparatus when the print media sheet returns for another pass. If the image forming apparatus continues to operate under this condition, there increases a risk of damaging stations of the apparatus. This damage can lead in a long term to image quality defects and more permanent mechanical problems.

There is thus a need for a system that provides a more visible layer of clear toner while reducing a risk of jamming the image forming apparatus.

INCORPORATION BY REFERENCE

This application is related to co-pending, commonly assigned U.S. patent application Ser. No. 12/913,226, filed Oct. 27, 2010, entitled "SIMULATED PAPER TEXTURE USING CLEAR TONER ON UNIFORM SUBSTRATE", and naming Mu Qiao, et al. as inventors, and is incorporated herein by this reference in its entirety.

BRIEF DESCRIPTION

A first embodiment of the disclosure is directed toward a method for rendering a clear toner layer. A print job description is provided in multiple channels, including a clear channel and a color channel. A program selection is executed for a multiple pass operation. Image processing is performed on the print job description to generate a ready-to-print file. A layer of an image is rendered in a first pass using a clear toner applying component and a pigmented toner applying component. The original values of the color channel are modified, and the ready-to-print file is modified using the modified values. The modified ready-to-print file is saved in a modified ready-to-print format. A layer of the image is rendered in a select pass using only the clear toner applying component.

A second embodiment of the disclosure is directed toward a system for rendering an image on a media sheet. The system includes a raster image processor adapted to image process a provided original print description. A pigmented toner applying component is included in the system for rendering a color layer on a media sheet. A clear toner applying component is also included for rendering a clear layer on the media sheet. The system further includes a memory for executing a multi-pass operation. The memory stores a print job description modifying component and a compressed image file including a modified print job description. A processor is included for processing instructions of the print job description modifying component after an image is rendered onto a media sheet using the print job description.

DETAILED DESCRIPTION

Figure 1:
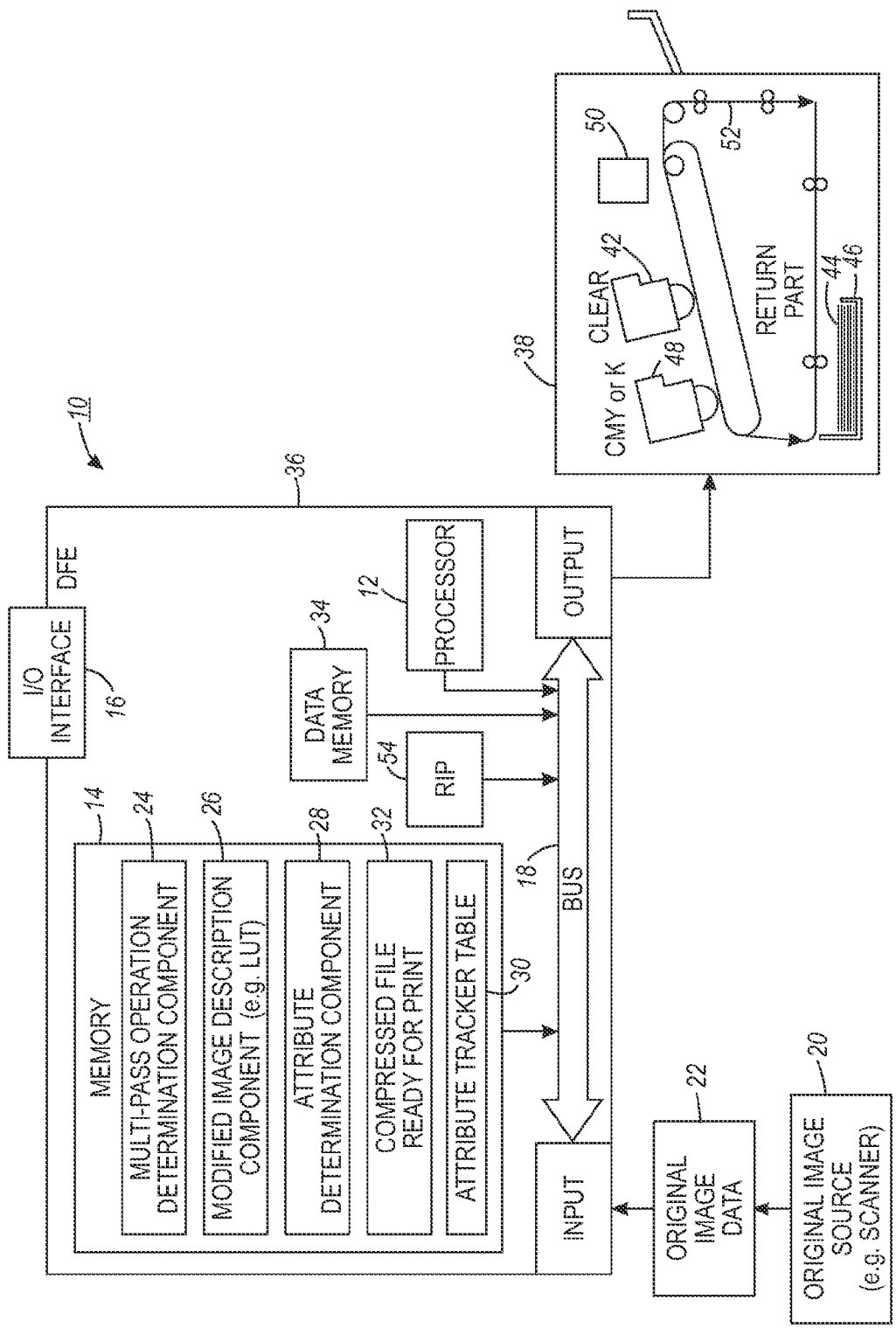
FIG. 1 illustrates a computer system for rendering a perceived textured substrate according to the disclosure; and, FIGS. 2 and 3 show a flow chart illustrating an operation according to the disclosure.

The present disclosure is directed toward a multiple pass (hereinafter referred to as a "multi-pass") system for rendering a clear and pigmented colorant layer onto a print media sheet.

The pigmented colorant layer is used to apply an image to the substrate. The image may generally include information in electronic form, which is to be rendered on the substrate or print media by an image forming apparatus. The image may include text, graphics, pictures, and the like. The process for applying the image to the substrate is referred to herein as printing or marking.

The clear colorant layer may be used to add perceived depth to the image. In other words, an application of clear colorant may be used to add a perceived third dimension to an image that is rendered on a generally uniform print media sheet. The print media sheet may be any two-dimensional substrate material that is adapted to carry toner and/or liquid ink (hereinafter collectively referred to as "toner"), which is applied using electronic, digital, xerographic, or laser printing methods.

A third-dimensional appearance is more specifically provided in the present disclosure by rendering multiple clear toner layers on the substantially two-dimensional material. In some embodiments, however, a third dimension may be discerned to the touch using select pile heights.

In conventional textured substrates, the third dimension is formed by a variable (or non-uniform) surface portion. The variable surface is defined as having first portions that are generally raised relative to second portions that are generally recessed. A uniform surface, as described herein, rather includes a generally constant substrate surface area.

The perceived textured substrate is achieved herein by an application of clear toner on the generally uniform substrate surface. The clear toner includes non-pigmented marking particles. The clear toner is formed of the same particles used in primary and subtractive (e.g. CMY and K) toners, except that the clear toner excludes the pigmenting component. In one embodiment, the toner may have a slight cast when it is applied to the substrate. This cast may provide a visual appearance of raised portions on the substrate. The clear toner may also provide a generally glossy appearance relative to a more matt appearance of the print media.

As used herein, an image forming device can include any device for rendering an image on print media, such as a copier, laser printer, bookmaking machine, facsimile machine, or a multifunction machine (which includes one or more functions such as scanning, printing, archiving, emailing, and faxing). "Print media" can be a usually physical sheet of paper, plastic, or other suitable physical print media substrate for carrying images. A "print job" or "document" is referred to for one or multiple sheets copied from an original print job sheet(s) or an electronic document page image, from a particular user, or otherwise related. An original image is used herein to mean an electronic (e.g., digital) or physical (e.g., paper) recording of information. In its electronic form, the original image may include image data in a form of text, graphics, or bitmaps.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

Figure 2:
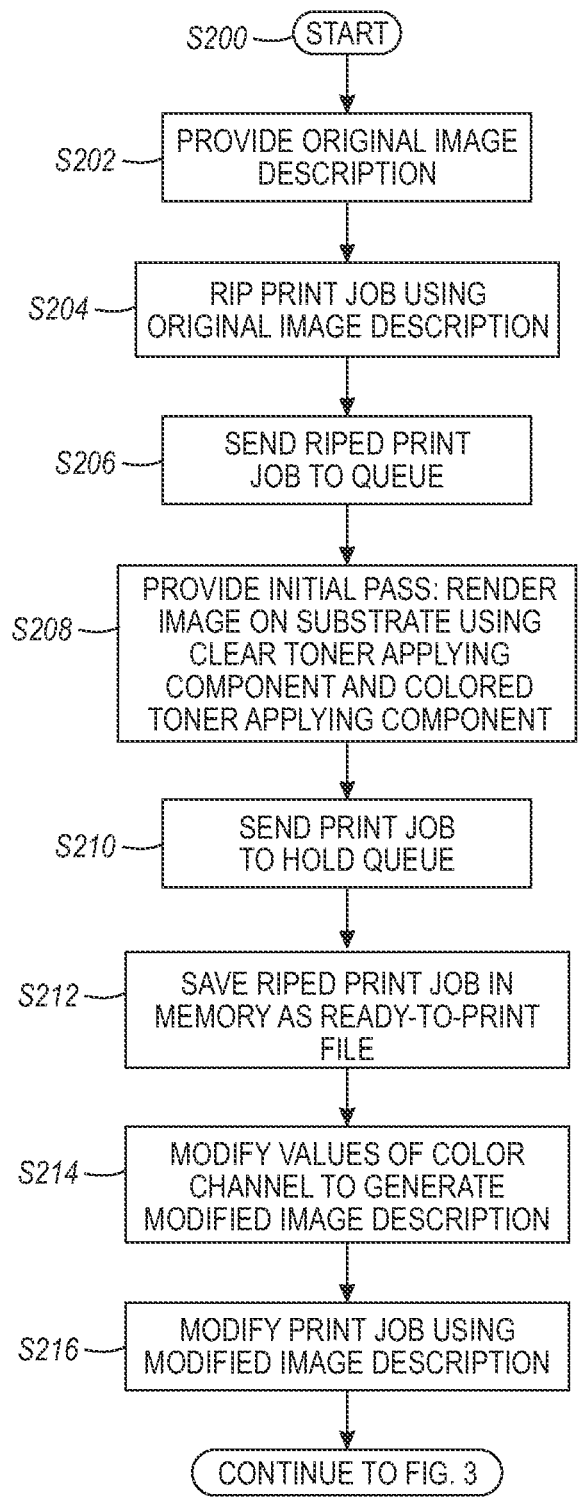
Figure 3:
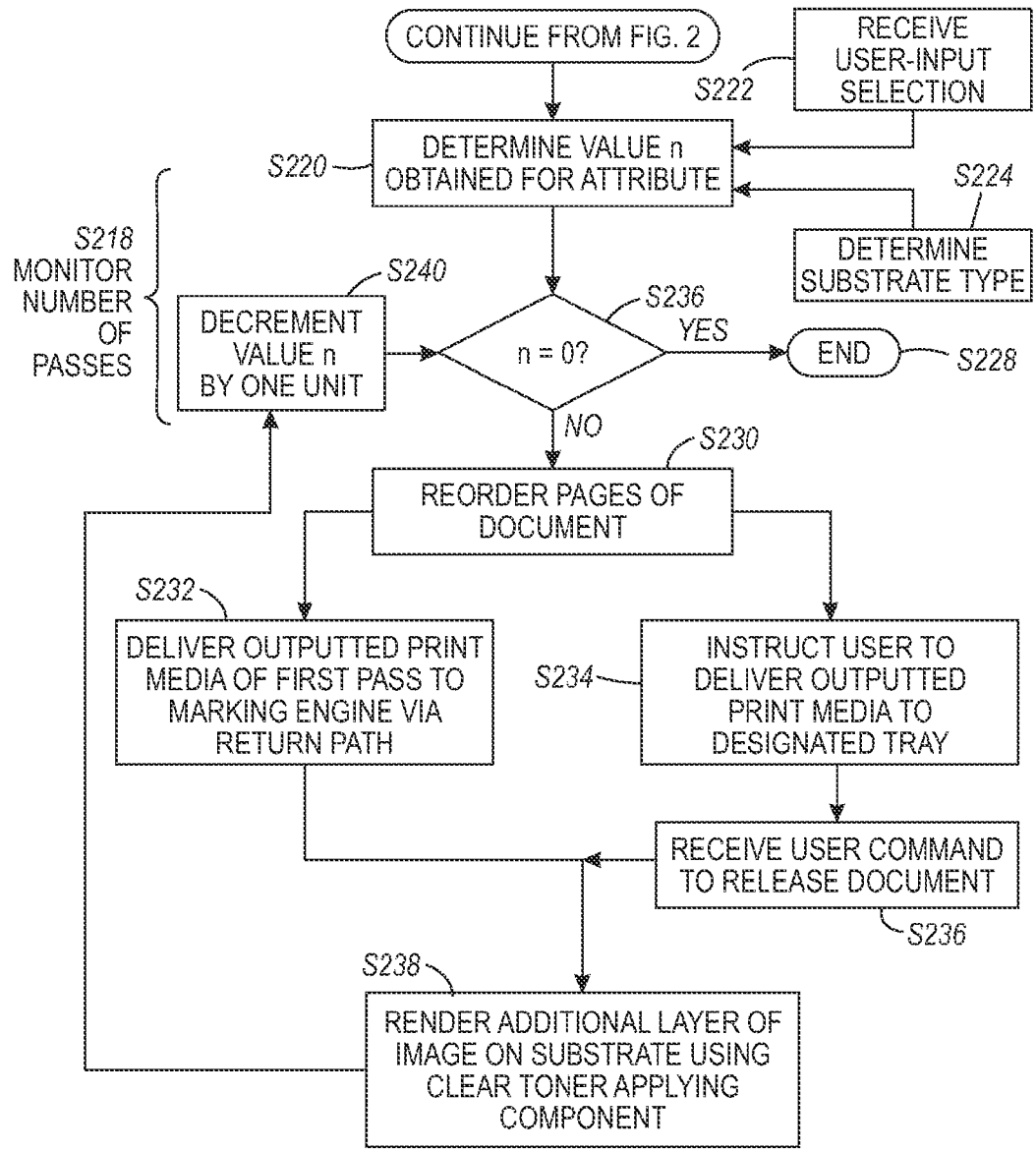

The method illustrated in FIGS. 2 and 3 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

With reference to FIG. 1, a functional block diagram of a computer system 10 is shown. The illustrated computer system 10 includes a controller 36 formed as part of at least one image forming apparatus for controlling an operation of at least one marking (or print) engine for forming the perceived dimension on print media substrates. Alternatively, the controller 36 may be contained in a separate, remote device that is connected to the image forming apparatus. The controller contains a processor 12, which controls the overall operation of the computer system 10 by execution of processing instructions which are stored in memory 14 connected to the processor 12. Computer system 10 also includes a network interface and a graphical user input output (I/O) interface 16. The I/O interface 16 may communicate with one or more of a display, for displaying information to users, and a user input device, such as a keyboard or touch or writable screen, for inputting instructions, and/or a cursor control device, such as a mouse, trackball, or the like, for communicating user input information and command selections to the processor 12. The various components of the computer 10 may be all connected by a bus 18. The processor 12 executes instructions for performing the method outlined in FIGS. 2 and 3. The computer system 10 may be a PC, such as a desktop, a laptop, palmtop computer, portable digital assistant (PDA), server computer, cellular telephone, pager, or other computing device (e.g., multifunction printer/copier device) capable of executing instructions for performing the exemplary method.

With continued reference to FIG. 1, the memory 14 may represent any type of tangible computer readable medium such as random access memory (RAM), read only memory (ROM), magnetic disk or tape, optical disk, flash memory, or holographic memory. In one embodiment, the memory 14 comprises a combination of random access memory and read only memory. In some embodiments, the processor 12 and memory 14 may be combined in a single chip. The network interface allows the computer to communicate with other devices via a computer network, such as a local area network (LAN), a wide area network (WAN), or the internet, and may comprise a modulator/demodulator (MODEM). The memory 14 stores instructions for performing the exemplary method as well as the processed data.

FIG. 1 further illustrates the computer system 10 connected to an original image source 20 for inputting an original description into the computer system 10. This original image source 20 may include an image capture device 20, such as a scanner or a camera, for converting an original two- or three-dimensional image into a two-dimensional electronic format.

Continuing with reference to FIG. 1, in another embodiment, the original image data 22 can be input from any suitable image source 20 such as a workstation, a database, a memory storage device, such as a disk, or the like. Typically, each input digital image includes image data for an array of pixels forming the image. The image data may include colorant values, such as grayscale values, for each set of color separations, such as L*a*b or RGB, or be expressed in another color space in which different colors can be represented. In general, "grayscale" refers to the optical density value of any single image data channel, however expressed (e.g., L*a*b, RGB, YCbCr, etc.). The images may be photographs, video images, combined images which include photographs along with text, and/or graphics, or the like. The images may be received in JPEG, GIF, JBIG, BMP, TIFF or another common file format used for images and which may be converted to another format such as CMYK colorant values prior to processing. Input textured and original images may be stored in the data memory during processing.

With continued reference to FIG. 1, the electronic original image data is processed by the processor 12 according to the instructions contained in the memory 14. The memory 14 stores a multi-pass operation determination component 24, a modified image description component 26, an attribute determination component 28, and an attribute tracker table 30. Components 24-30 will be later described with reference to the method. The data undergoes processing according to the various components for generating a print instruction, which is stored in the data memory 34. The memory 14 may also store a compressed file 32, which includes the original description in a ready-to-print format for further processing. Instruction data may be provided in the ready-to-print file, which may be generated by a raster image processor 54. The instruction data 40 may be output from the controller 36 for further print processing at the print engines.

The original image source 22 is in communication with the controller 36 containing the processor 12 and memories 14, 34. The controller 36 may be formed as part of at least one image forming apparatus 38 for controlling an operation of at least one marking (or print) engine for forming the perceived texture on print substrates. Alternatively, the controller 36 may be contained in a separate, remote device that is connected with the image forming apparatus.

FIG. 1 further illustrates that the image forming apparatus 38 includes at least one print engine. A clear toner applying component, such as cartridge 42, supplies clear toner for applying to a print media substrate passing through a print engine. In the illustrated embodiment of FIG. 1, the substrate 44 is delivered to the print engine from tray 46. A color applying component (i.e., a source of pigmented toner), such as colorant toner cartridge 48, supplies at least one of CMY and K pigmented colorants (or other pigmented colorants) for applying colored toner to the print media substrate passing through the print engine.

The marking engine(s) includes many of the hardware elements employed in the creation of desired images by electrophotographical processes. In the case of a xerographic device, the marking engine typically includes a charge retentive surface, such as a rotating photoreceptor in the form of a belt or drum. The images are created on a surface of the photoreceptor. Disposed at various points around the circumference of the photoreceptor are xerographic subsystems which include a cleaning device, a charging station to be applied, such as a charging corotron, an exposure station, which forms a latent image on the photoreceptor, a developer unit, associated with each charging station, for developing the latent image formed on the surface of the photoreceptor by applying a toner to obtain a toner image, a transferring unit, such as a transfer corotron, for transferring the toner image thus formed to the surface of a print media substrate, and a fuser 50, which fuses the image to the substrate. The fuser 60 generally applies at least one of heat and pressure to the sheet to physically attach the toner. A return paper path 52 delivers the original print media substrate to the same or different marking engine for at least a second layer of clear toner to be applied. Each return of the print media substrate to the marking engine is referred to herein as a "pass".

Referring to FIGS. 2 and 3, an operation is described for providing a select number of passes of a print media substrate and/or sheet through the image forming apparatus for rendering at least two layers of clear toner on the media sheet. More particularly, the method is shown for the system when a multi-pass operation is executed. One aspect of the multi-pass operation is that it provides images rendered as output with a tactile edge, thus making an aimed (third) dimension more visible in effect. The memory stores a multi-pass operation determination component (see 24 of FIG. 1), which determines whether a multi-pass operation selection is made for executing the method. In one embodiment, the multi-pass operation determination component receives an instruction for executing the method a user-entered selection. The application used to create a document may include an option for a multi-pass operation, which may be provided in a standard pull-down menu. The multi-pass operation command and/or instruction may be selected in the application program while a document is being created and before the document is completed (i.e., the creation stage), which is before a print command is selected (i.e., the print stage). Accordingly, a menu lists the multi-pass option with other options of the application used for forming the document. For example, the multi-pass operation option may be included in an application for forming perceived textured documents.

In another embodiment, however, the multi-pass operation option may not be included as part of the application. Rather, the user may select the multi-pass operation option after the document is created and a print command is executed. In this embodiment, a print driver menu may appear in a window resulting from the selection to print. The option may be provided in the same or a different property window that presents the page range, number of copies, orientation, and finishing options, etc. The user may select a multi-pass operation as a type of print operation, wherein the selection results in the print media substrate being subject to at least two passes through at least one marking engine. In this manner, a select pile height may be built on the substrate at select regions.

The method starts at S200. An original image description is provided at S202. More particularly, an original image description may be generated and received by the controller (see 36 of FIG. 1). The original image source (see 20 of FIG. 1) may be used to input an original image into the system 10. Original image data may be input into the system using a (high resolution) image capture device, wherein an original print media substrate may be scanned to capture an image. The scanned data is converted into electronic information (format). The original print media substrate may be a generally two-dimensional substrate, or it may be a generally three-dimensional substrate.

In another embodiment, an original description may be mathematically created using existing techniques in computer graphics, image processing algorithms, or online libraries. For example, an image may be generated by user-design using the I/O interface in an open application. Texting and shading may be applied to the image for producing select visual effects, such as an aimed degree of dimension, for when it is rendered onto the print media substrate. The image may be made viewable on the display during the creation stage.

In another embodiment, previously generated electronic data may be provided to the system. For example, the electronic data may be carried on a media disc, flash drive, zip drive, and the like, and transferred to the system. The electronic data may be communicated to and/or uploaded to the controller for processing in a conventional manner.

The controller receives the scanned or alternatively produced original image data and may contain it in the memory until a command for printing is selected and/or executed (in the print driver window). More particularly, the image data (i.e., data corresponding to the original image description) undergoes a set of instructions and/or computations to generate the print instruction data. The print instruction data is stored in the data memory of FIG. 1.

The original image description may be provided in at least one color channel (e.g., C, M, Y, or K). In another embodiment, the original image description may be provided in multiple channels, including a clear channel and at least one color channel. There is no limit made to a number of channels. Generally, each channel is represented in the print instruction data as being either "on" or "off". The print instruction data provided by the original image description generally maintains all channels in the "on" state.

With continued reference to FIG. 2, the print instruction data is used to raster image process (RIP) the print job when the print command is selected in the print driver menu. A raster image processer uses the original image description at S204 to RIP the print job. Accordingly, the print instruction data is converted to a printer-readable language. The print job description is generally used to generate a ready-to-print file. The ready-to-print file may be a compressed file that can be repeatedly accessed for multiple (and subsequent) passes.

With continued reference to FIG. 2, when the print command is selected for a multi-pass operation, the RIPed print job is sent to the queue at S206. The marking engine uses the print instruction data to render an image on a print media substrate at S208. More particularly, the image is rendered onto the substrate using at least a colored toner applying component. However, embodiments are contemplated in which only a clear toner applying component is used. A layer of colored toner may be applied to the substrate to form a visible image in the form of the text, graphic, and/or picture. If the print instruction data further includes data corresponding to a clear channel description, a layer of clear toner may be rendered onto the substrate at S208 during the same (i.e., first/initial) pass.

After the first pass, the print job is held in a hold queue at S210, which holds the job until the additional passes. Furthermore, the ready-to-print file may be saved to the memory 14 after the first pass at S212. The RIPped file may then be reused for further operations. The processor 12 uses the compressed ready-to-print file to modify pixel values at S214. More particularly, the processer uses the modified image description component (see 24 of FIG. 1) contained in the memory 14 to generate a modified image description using the original print instruction data stored in the compressed file.

The modified image description component uses the processor to suppress the color channels. In the first pass, each pixel of the image is represented by one 8-bit byte for describing a color of the pixel. The image information is stored in the memory as part of the image description, and the controller uses the information to render for the pixel a color from a palette of 256 colors. The color for the pixel is described as a value between, for example, 0 and 255 for the 8-bits. However, the processor modifies the pixel values of the original image description at S214 for the additional passes. The pixels representing the color channel are driven to a zero "0" value data representation, which represents "white" color on the palette. In other words, no application of colored toner is rendered for the pixels which are all assigned the zero "0" value in the additional passes. The pixel values for the clear channel, however, are maintained at their original values. An application of clear toner is rendered onto the substrate in the additional passes for the pixels of the clear channel. In this manner, each subsequent (additional) pass of the print operation will use only a clear toner applying component to render (i.e., build) clear toner (layers) on the print media substrate.

In another embodiment, a specialized calibration tone reproduction curve (TRC) may be used to assign modified values to the color channels that will result in no colorant toner being used in additional passes, wherein the additional passes include at least the second pass. It is further contemplated that other embodiments start with pixel values in a color channel that are reassigned values corresponding to an amount of clear toner that is alternately applied in the additional passes. In other words the color channel may be converted to a clear channel.

The modified pixel values are used to modify the ready-to-print file at S216. In other words, the modified print job data is saved in a modified ready to print format for use in at least a second pass. The number of additional passes of the multi-pass operation is based on a particular attribute. The second pass is not executed until a determination is made with regard to the attribute.

One aspect of the present disclosure is an ability to render multiple layers of a clear toner onto a print media substrate without degrading the substrate and causing potential jams to the marking engine. The aspect is generally accomplished by including an attribute tracker component in the presently disclosed system. At S218, the attribute tracker component (see 30 of FIG. 1) generally monitors a number of passes that one print media substrate is subjected to. The attribute tracker component maintains the number of passes below a threshold value, which is based on an attribute. More particularly, the attribute tracker component maintains that the print media sheet does not continue to pass through the marking engine when there is the risk of degradation.

The tracking operation S218 determines a value obtained for an attribute at S220. An attribute is a changeable property or component that can be set to different values. One example of an attribute of the present disclosure includes a number of clear toner applications (or passes) to be rendered on the print media substrate. The number of clear toner coats rendered onto the substrate may be different for each print job. More specifically, the amount of clear toner (i.e., the number of passes/coats of clear toner) may be an attribute of a select pile height, and it may be represented by a value n. In another embodiment, the number of clear toner passes may be an attribute of a select substrate type, which is also represented by a value n. There may be limitations on the number of passes that a substrate type can withstand based, for example, on the material, the thickness, and the flexural strength. In another embodiment, the attribute of the number of passes for rendering clear toner layers may be based on the property of dimension. More particularly, the desired dimension in a perceived texture document may correspond to a halftone amount of the clear toner for achieving certain visible results.

As mentioned, the tracker component determines the value n for the attribute at S218. In one embodiment, the initial value may be received as a user input at S222 using the I/O interface. For example, the user may input a desired value corresponding to a select number of clear toner passes. The desired value may be programmed by the user as a general default value, which is to be applied to each print job. Alternatively, the desired number of passes may be selected by the user for each individual print job. It is contemplated that a sub-selection for requesting a number of clear layers may be presented as an icon or selection in a window that displays and/or opens when the multi-pass operation is selected during the creation or print stage phase.

In another embodiment, the system may compute the number of passes based on an input variable. An example of an input variable may include a paper type. In one embodiment, the system may include programmed recommendations for different paper types. These recommendations may be stored, for example, in a look-up-table. The system may include intelligence that displays to a user a maximum number of passes that a print media substrate, such as a heavy weight paper, can withstand before degradation. The recommendations may be displayed in embodiments that have the user input an attribute value. The number of passes for the print job may be limited by the image output terminal (IOT) specification based on a number of passes that the marking engine or print paths is capable of supporting without causing a risk of jamming. In another embodiment, the system may compute the value at S220 based on a user-selection that is input for a paper media substrate type. In yet another embodiment, the system may compute the value at S220 based on a paper type that is detected at S224 by a sensor mechanism.

With continued reference to FIG. 3, the clear pass value n that is determined at S220 is compared to a threshold value at S224. In the discussed embodiment, the reference value is zero "0". In other words, the clear pass value, defining the number of remaining passes, determines whether or not the print media substrate will undergo another pass through the marking engine. If the attribute/clear pass value meets the threshold, then the print operation is designated as complete at S228. However, the substrate undergoes another pass through the marking engine if the attribute value is greater than the threshold value.

Accordingly, the same print media substrate that was used to carry the image at S208 is repositioned into the path of the marking engine at 230 for a second image forming operation. In one embodiment, a return path (see 52 of FIG. 1) may automatically return the print media material (see S232) to the photoreceptor of the same or different marking engine so that an additional layer of toner may be rendered onto the substrate at S238. In another embodiment, the display of the I/O interface may direct the user at S234 to return/reinsert the print media substrate into a tray for delivering the substrate to the marking engine for the additional pass.

In yet another embodiment, the system may direct the user to reload the printed documents of the first pass into a designated tray using instructions carried on a banner page. Additionally, the banner page or display may instruct the user to reload the printed output in a designated orientation. If the document that was printed in the first pass includes multiple sets and/or pages, the banner sheet or display may direct the user to place the printed output into the designated tray in a designated order. The system may require that the pages/set of the document be loaded into the designated tray in a particular order to ensure that the toner rendered during the second or additional pass is printed on the same page and side as it was on the first pass. In yet another embodiment, the processor may re-order the RIPed pages of the document to ensure that the toner of the second pass is printed on the same page and side as the first pass.

In certain embodiments including an instruction to the user to place the printed output in a designated tray to return it to a marking engine, the display and/or banner sheet may include an instruction directed toward releasing the print job at S236 for the next pass. They system may not execute the additional pass(es) until it determines that the user inputs a command to release the print job. In this manner, the system may be ensured that the print output is placed in the tray in proper orientation.

However, in an automatic operating embodiment, no operator instructions are presented to the user because the system may detect and track each page of a document as it moves through a return print path to the first or a second marking engine. Accordingly, embodiments are contemplated in which no release operation is necessary. As mentioned herein, automatic operations are contemplated that do not require operator directions.

In the additional pass of S238, the clear toner applying component renders an additional layer of clear toner onto the substrate. It is contemplated that the additional layer is superimposed on a previously applied layer of pigmented or clear toner. However, there is no limitation made herein to a surface region of the substrate for which the additional toner layer is applied. Because the modified ready-to-print file includes a zero "0" value data pixel representation assigned to color channels, the clear toner applying component is only used to render the additional layer(s). The modified pixel values for the color channel were shut off at S214, therefore the colored toner applying component is not used in the additional pass.

After the additional layer of clear toner is rendered onto the substrate, the attribute tracker component decrements the attribute clear pass value n by one unit at S240. An updated value n' is assigned to the attribute. The process of tracking S218 repeats itself until the attribute value equals the threshold value at S224.

While the discussed embodiment tracks a number of passes remaining in the multi-pass operation, embodiments are contemplated that track the attribute value n using a threshold value which corresponds to a total (i.e., the maximum) number of passes that is selected and/or computed for the substrate. For example, the first pass rendered at S208 may count as one-unit, such that the starting attribute value n equal to one ("1") at S224. As mentioned, the starting attribute value may be compared to the (total passes) threshold value. If the attribute value is lower than the threshold value, the print media substrate may be returned to the marking engine for an additional layer of clear toner to be applied thereon. After the additional pass, the attribute value n may be incremented by one-unit. The process would then repeat itself until the attribute value met the threshold value, which is the assigned total number of passes in the multi-pass operation.

Although the control method is illustrated and described herein in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for rendering a clear toner layer, comprising:
   providing an original print job description in multiple channels including a clear channel and a color channel;
   executing a program selection for a multi-pass operation;
   performing image processing on the print job description to generate a ready-to-print file;
   rendering a layer of an image on a media sheet in a first pass using a clear toner applying component and a pigmented toner applying component;
   modifying values of the color channel;
   modifying the ready to print file using the modified values;
   saving the modified ready to print file in a modified ready to print format;
   tracking a number of select passes that the clear toner applying component renders a layer of the image against a threshold, the threshold being based on a total number of passes determined for the media sheet;

in response to the tracking, returning the media sheet to the clear toner applying component for at least one additional layer of the clear layer being rendered on a same side of the media sheet until the number equals the threshold; and, rendering a layer of the image in a select pass using only the clear toner applying component.

2. The method of claim 1, further including:

before rendering the layer of the image in the select pass, determining a value contained for an attribute of the clear channel.

3. The method of claim 2, wherein the determining further includes:

receiving a user-input value corresponding to a select number of passes.

4. The method of claim 2, wherein the determining further includes:

computing a number of total passes based on a received media sheet-type selection.

5. The method of claim 2, wherein the selectively rendering the image in a second pass includes:

returning a media sheet carrying the image to an image output terminal if the value is not equal to zero.

6. The method of claim 2, further including:

decrementing the value by one unit after rendering the image in the second pass.

7. The method of claim 1, wherein the modifying includes:

reassigning values of the color channel to zero.

8. The method of claim 1, wherein the modifying includes:

calibrating values of the color channel using a tone reproduction curve (TRC).

9. The method of claim 1, wherein the modifying values of the color channel includes:

zeroing out all the color channels such that the modified ready to print file includes only clear values.

10. A non-transitory computer readable medium encoded with instructions which, when executed, perform the method of claim 1.

11. A system for rendering an image on a media sheet, comprising:

a raster image processor adapted to image process a provided original print job description;

a pigmented toner applying component for rendering a color layer on a media sheet;

a clear toner applying component for rendering a clear layer on a media sheet;

a memory for executing a multi-pass operation, including:
a print job description modifying component,
a compressed image file including a modified print job description, and
an attribute table stored in the memory for tracking that a number of passes that the clear toner applying component renders a clear toner layer on the media sheet meet a threshold, the threshold being based on a total number of passes determined for the media sheet;

a return paper path for, in response to the tracking, delivering the media sheet to the clear toner applying component for at least one additional layer of the clear layer being rendered on a same side of the media sheet and being equal to the threshold; and, a processor for processing instructions of the print job description modifying component after an image is rendered onto a media sheet using the print job description.

12. The system of claim 11, further including:

an attribute determination component for determining a value contained for an attribute of the clear channel.

13. The method of claim 12, further including:

a user-interface for inputting the value being selected for a number of passes.

14. The method of claim 12, wherein the attribute determination component determines the value based on a select media sheet-type.

15. The method of claim 11, further including:

an image input source operable to receive the original print job description.

16. The method of claim 11, wherein the print job description modifying component is adapted to reassign select colored channel pixel values to zero.

17. The method of claim 11, wherein the memory further includes:

a multi-pass determination component operable to determine if a multi-pass operation is selected using an application.

18. The method of claim 11, further including:

an output path operable to return the media sheet to the clear toner applying component.

19. The method of claim 11, wherein the threshold is based on one of a select pile height, a select substrate type, and a property of dimension.

* * * * *